US006141621A

United States Patent [19]

Piwowarski et al.

[11] Patent Number: 6,141,621

[45] **Date of Patent: *Oct. 31, 2000**

[54] METHOD OF PROVIDING A TEXTUAL DESCRIPTION OF A REMOTE VEHICLE LOCATION

[75] Inventors: James Piwowarski, Holly; Mark Malinowski, Farmington Hills, both of Mich.

[73] Assignee: Magellan DIS, Inc., Rochester, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/691,727

[22] Filed: Aug. 2, 1996

[51] Int. Cl.[7] .............................. G08G 1/123; H04B 1/38

[52] U.S. Cl. .......................... 701/207; 701/211; 340/989

[58] Field of Search .................................... 701/200, 201, 701/202, 205, 207, 208, 209, 210, 213, 214, 217; 340/988, 902, 990, 989; 342/357, 457, 357.07

[56] References Cited

U.S. PATENT DOCUMENTS

| | | | |
|---|---|---|---|
| 5,155,688 | 10/1992 | Tanaka et al. | 701/221 |
| 5,208,756 | 5/1993 | Song | 455/456 |
| 5,293,163 | 3/1994 | Kakihara et al. | 340/995 |
| 5,428,546 | 6/1995 | Shah et al. | 701/207 |
| 5,539,397 | 7/1996 | Asanuma et al. | 340/901 |
| 5,543,789 | 8/1996 | Behr et al. | 340/995 |
| 5,587,911 | 12/1996 | Asano et al. | 701/202 |
| 5,627,549 | 5/1997 | Park | 701/300 |
| 5,638,279 | 6/1997 | Kishi et al. | 701/200 |

*Primary Examiner*—Tan Nguyen
*Attorney, Agent, or Firm*—Carlson, Gaskey & Olds

[57] ABSTRACT

A vehicle assistance request system includes methodology for accurately and specifically identifying the vehicle location when a request is made. A written, textual description of the vehicle location, identifying streets, addresses, and other available information is provided to enhance the ability of the service provider to locate the vehicle. Further, response time is reduced and accuracy in locating a vehicle is increased. The method of this invention includes a multi-tiered decision process for determining where the vehicle is located.

26 Claims, 2 Drawing Sheets

Fig-1

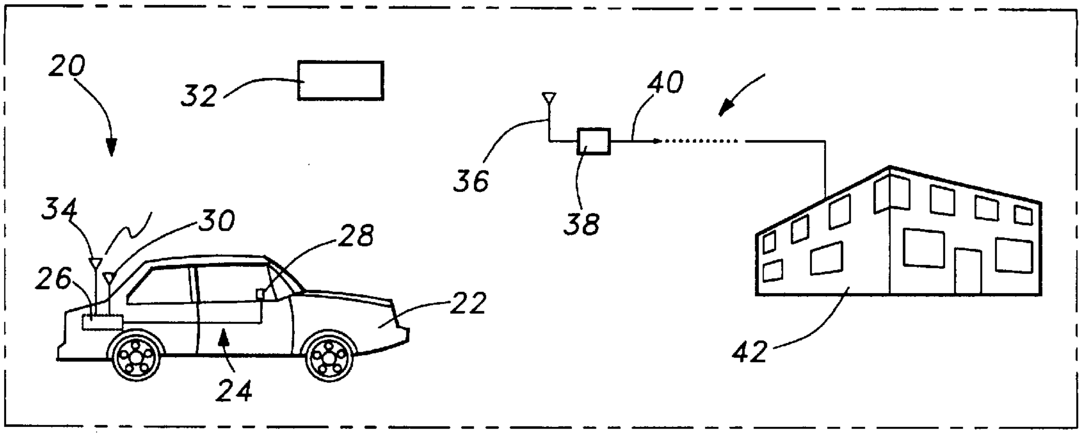

50

| | COMPONENT | DESCRIPTION |
|---|---|---|
| 52 | City | City corresponding to vehicle location |
| 54 | County | County corresponding to vehicle location |
| 56 | State | State corresponding to vehicle location |
| 58 | Address | Address of street the vehicle is on or nearest to |
| 60 | Street | Name of street the vehicle is on (or nearest to) |
| 62 | Zip code | Zip code corresponding to vehicle location |
| 64 | Cross streets | Name of streets which intersect with street and bound the vehicle location |
| 66 | Nearest intersections | Name the intersections near vehicle location |
| 68 | Database | Name the database which corresponds to vehicle location |
| 70 | Error | Errors while generating dispatchable location |

Fig-2

METHOD OF PROVIDING A TEXTUAL DESCRIPTION OF A REMOTE VEHICLE LOCATION

BACKGROUND OF THE INVENTION

This invention generally relates to a system for requesting roadside assistance from a vehicle at any location. More specifically, this invention relates to a method for providing a textual description of the remote location of a vehicle where roadside assistance is required.

Systems are currently in use that allow a driver of a vehicle to request roadside assistance such as medical, police, or vehicle repair services. Current systems operate in the following general manner. The vehicle driver initiates a request through an on-board device that generates a signal, which is propagated through cellular communications, indicating that roadside assistance is needed. The vehicle location is determined through a global positioning system, for example. An operator then receives the vehicle location information from the global positioning system along with an indication that there has been a request for assistance. The operator then places a phone call to the driver of the vehicle to determine the location of the vehicle more precisely and to determine exactly what assistance may be needed. In most instances, however, the information given by the driver is inaccurate and unreliable. For those occasions where the driver of the vehicle is unable to provide specific location information, the operator is provided with a map showing the area within the vicinity of the vehicle.

Although existing systems may be useful, they have several shortcomings and drawbacks. For example, there is a need for a system that automatically provides more precise vehicle location information. There is also a need for a system that automatically produces adequate information to an operator in the service being dispatched, without requiring communication directly with the driver of a vehicle over a cellular network. Further, it is desirable to have a system that simplifies the task of an operator in dispatching the requested service provider.

This invention provides a system that avoids the shortcomings and drawbacks of the systems described above. A system designed according to this invention activates a vehicle assistance request upon the push of a single button. Upon activation, the location of the vehicle and the type of emergency service requested is transmitted through a mobile data communications network to a dedicated monitoring center for handling such requests. Once a request signal is received at the monitoring center, vehicle coordinates, which are determined through a global positioning system, are converted to the closest street address and nearest intersections to the vehicle location. After the vehicle location, vehicle identification, subscriber information and the type of emergency service requested is determined, an operator dispatches the appropriate service provider. Importantly, the vehicle location information is provided in a textual format that is readily interpreted and eliminates the guesswork that typically accompanies map reading, which increases the speed and accuracy with which the requested service is provided to the vehicle driver.

SUMMARY OF THE INVENTION

The method associated with this invention for providing information regarding the location of a remotely located vehicle is accomplished in several basic steps. First, the placement of the vehicle is determined by determining the longitudinal and latitudinal coordinates of the vehicle. The speed and direction of travel of the vehicle are also determined. The placement and travel information regarding the vehicle are then used to generate a textual description of the vehicle location wherein the description lists the street where the vehicle is located.

The street where the vehicle is located preferably is determined by determining whether any street within a selected distance from the vehicle location coordinates has a corresponding direction of travel and speed that are consistent with the travel information regarding the vehicle. In the event that no such street is found, a determination is made whether any street within the selected distance from the vehicle coordinates has a direction of travel that corresponds to the direction of travel of the vehicle. In the event that no such streets are found, the system finds the street nearest to the vehicle location coordinates.

In one embodiment, only the vehicle location coordinates are provided (such as when the vehicle is not moving) and the street where the vehicle is located is determined by finding the street nearest to the location coordinates.

The various features and advantages of this invention will become apparent to those skilled in the art from the following detailed description of the presently preferred embodiment. The drawings that accompany the detailed description can be described as follows.

BRIEF DESCRIPTION OF THE DRAWINGS

FIG. 1 is a schematic illustration of a vehicle assistance request system.

FIG. 2 is a chart illustrating the preferred textual information generated by a system designed according to this invention.

DETAILED DESCRIPTION OF THE PREFERRED EMBODIMENT

Figure 3:
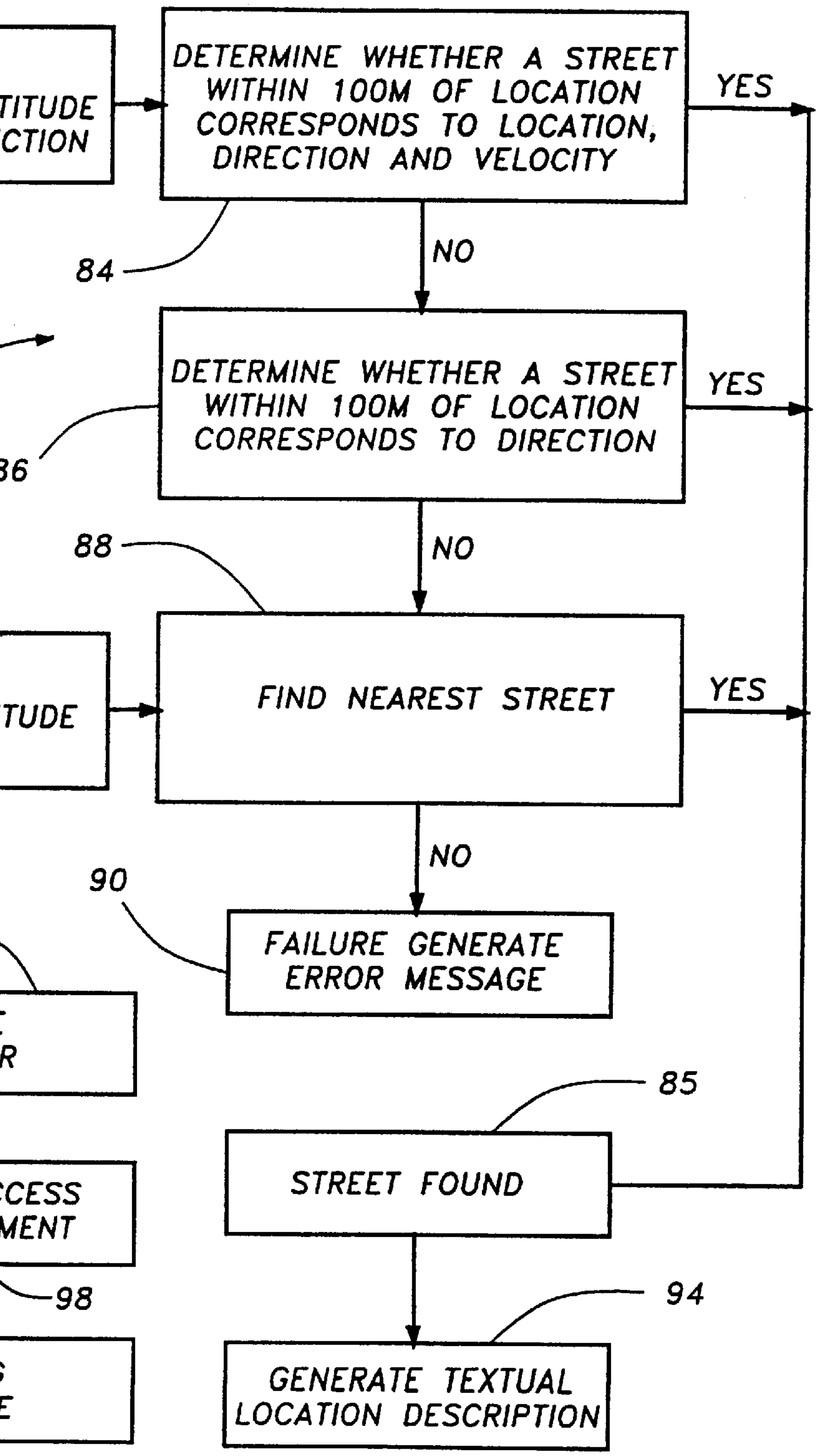
FIG. 3 is flow chart diagram illustrating the methodology associated with this invention.

FIG. 1 schematically illustrates a vehicle roadside assistance request system or emergency response network 20. A vehicle 22 includes an on-board assistance request system 24. The request system 24 includes a controller unit 26 and an operator interface module 28. The operator interface module 28 preferably is located within the passenger compartment of the vehicle such that it is easily accessed by the driver of the vehicle. The control unit 26 includes a computer that handles all signal processing at the vehicle location.

An antenna 30 facilitates communication between the system 24 and a global positioning network 32. A variety of global positioning technologies are available and operative, and can be accessed by a system designed according to this invention as will be understood by those skilled in the art. State of the art global positioning system technologies generally have excellent availability and location accuracy capabilities. Typical global positioning systems can provide vehicle location information to an accuracy within 100 meters of the actual location 95% of the time and within 300 meters 100% of the time. Vehicle location typically is determined within 40 meters of the actual location. A system designed according to this invention preferably includes averaging and screening algorithms that utilize and enhance the raw global positioning system data.

Another antenna 34 is utilized to transmit a data communications signal, which preferably is in a Mobitex format, to a remotely located antenna 36 that is coupled to a Mobitex tower 38. The Mobitex tower 38 is connected through dedicated transmission lines 40 to a request monitoring center 42. The request monitoring center 42 includes appropriate devices for facilitating the handling of various service requests and enabling operators to dispatch the appropriate roadside service.

In a system designed according to this invention, when a vehicle roadside assistance request is generated, the information provided to the request monitoring center 42 includes the vehicle location coordinates, such as the longitude and latitude of the vehicle placement. Also provided are the vehicle direction and speed of travel. In instances where the vehicle is not moving, only the location coordinates will be provided. A system designed according to this invention then converts that information into a textual description of the vehicle location.

FIG. 2 contains a chart 50 illustrating the various items within the preferred textual description provided by this invention. Most preferably, complete addressing information (items 52 through 62) is provided. Further, the cross streets 64 that intersect with the street where the vehicle is located, are also determined and provided in the written description. The cross streets that are listed preferably are those that bound the vehicle location. For example, when the vehicle is on a street that runs east and west the nearest cross street to the east of the vehicle and the nearest cross street to the west of the vehicle are provided.

In some instances, the street where the vehicle is located will not necessarily be named or the name of the street may be unknown. In such instances, the nearest intersections to the vehicle location are provided at 66. With a written description of the nearest intersections and the other information regarding the vehicle, the requested service can be more readily provided.

The textual description of the vehicle location preferably is supplemented with an identifier of the database 68 from which the information is gathered and any error messages 70, which describe any errors encountered in generating the textual description from the vehicle placement and travel information.

A main concern in providing a written description of the vehicle location is determining the street where the vehicle is located. FIG. 3 illustrates, through a flow chart diagram 80, the preferred methodology for determining the street where the vehicle is located. When the input 82 includes the longitudinal and latitudinal placement of the vehicle and the speed and direction of travel information, a three step analysis preferably is performed. First, as shown at 84, an attempt to locate the street is performed by considering streets within 100 meters of the location coordinates of the vehicle. The preferred range is 100 meters, however, any useful range could be selected. Any street within that range having direction and speed information is compared with the speed and direction information regarding the vehicle. For example, if it is known that the vehicle is traveling west, those streets that allow for travel in a west direction are selected as possible candidates. The speed limits of those possible candidates are utilized to determine a speed range, which is based upon street class information within the preferred database, that is compared to the speed of the vehicle. The system preferably recognizes a range of speeds that reaches above and below a given street's limit. In other words, the vehicle speed need not exactly match a given speed limit. If there is a match of a street within 100 meters of the location of the vehicle that also matches the direction and speed of the vehicle, the decision is made that the street has been found at 85.

If no match is found for all three variables at 84, then an attempt to find the street is performed at 86. Streets within 100 meters of the vehicle location coordinates are chosen and direction information regarding those streets is utilized to find a match. If any street that is within 100 meters of the location coordinates has a direction of travel that corresponds to the direction of travel of the vehicle, then the street is considered found at 85.

In the event that no street within 100 meters of the location coordinates of the vehicle has a direction that corresponds to the direction of travel of the vehicle, an attempt is made to find the nearest street at 88. This preferably is accomplished by choosing the street closest to the actual coordinates. If such a street exists, then the street is considered found at 85.

In the event that no street is found that matches the input data from 82, then a failure or error message is generated at 90 indicating that the vehicle location has not been accurately obtained. Under such circumstances, a computer generated map of the area surrounding the vehicle location coordinates can be provided to assist the operator and the service provider.

Alternatively, the input regarding the vehicle location can consist only of the longitude and latitude location coordinates. When the input 92 has only placement information, then attempt is made to find the nearest street 88. If there is a match, then the street is considered found at 85.

Once the street is found at 85, then the system proceeds to generate a textual location description at 94.

Figure 4:
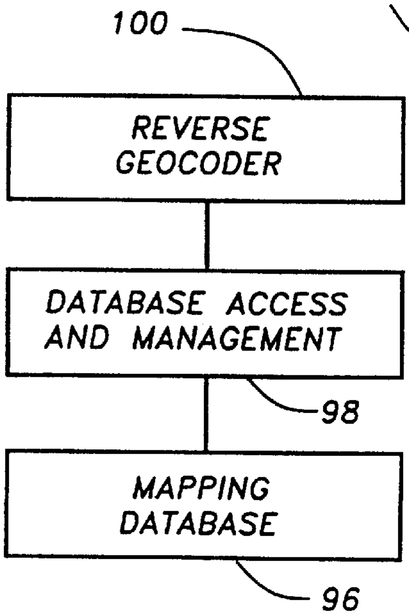
FIG. 4 is a block diagram schematically illustrating the configuration of a system designed according to this invention.

FIG. 4 illustrates, in block diagram form, the general software structure of a system designed according to this invention. A mapping database 96 is accessed through an access and management module 98 by a reverse geocoder module 100. The reverse geocoder module 100 is the driving force behind converting the vehicle location coordinates into a textual description of the vehicle's location. The presently preferred mapping database is a digital spacial database that is commercially available from ETAK Corporation, which is located in Menlo Park, Calif. The preferred access and management module is also commercially available from ETAK and is known as their application programmer's interface. Those skilled in the art will be able to develop the specific code necessary to implement the reverse geocoder module, given this specification.

Once the street is located, the system performs a similar analysis in order to determine, as closely as possible, an address where the vehicle is located. The availability of address information will depend upon the mapping database that is chosen.

In addition to the street and address information, the preferred textual description also provides cross streets or the intersections nearest to the vehicle. In the event that the street name is known, cross streets are typically also identifiable by name. Most preferably, the cross streets that are provided are those that bound the vehicle location Cross streets can be located by searching through the database for the nearest streets intersecting the street where the vehicle is located. This preferably is accomplished by beginning at the vehicle location and moving along the street where the vehicle is located until a cross street is found. This is performed in opposite directions in order to provide a cross street on each side of the vehicle location. The system also most preferably provides information indicating the distance between the vehicle and the cross streets and the orientation of the vehicle with respect to those streets.

In the event that the street where the vehicle is located is not named or the name of the street is unknown, given the information from the database, then the nearest intersections of streets with known names are provided. These intersections are located preferably in a manner similar to that just described regarding cross street location.

As can be seen, a system implementing the method of this invention provides significant advantages. The textual description of vehicle location provides more accurate and more readily interpreted data. System operators and service providers can more easily find the vehicle where assistance is required. Operators need not be concerned about inaccurate guesswork in interpreting a computer-generated map. Further, operators can handle more incoming requests because they can devote significantly less time to guiding a service provider to the vehicle location.

The preceding description is exemplary rather than limiting in nature. Variations and modifications to the disclosed embodiment will become apparent to those skilled in the art that do not necessarily depart from the spirit and scope of this invention. Accordingly, the following claims must studied in order to determine the legal scope given to this invention.

What is claimed is:

1. A method of providing information regarding the location of a remotely located vehicle, comprising the steps:

(A) generating an assistance request signal from the vehicle;

(B) receiving the assistance request signal at a second location, remote from the vehicle;

(C) determining a longitudinal placement of the vehicle;

(D) determining a latitudinal placement of the vehicle;

(E) determining a speed of travel of the vehicle;

(F) determining a direction of travel of the vehicle;

(G) generating a textual description of the vehicle location using the placement and travel information from steps (C) through (F) and providing the textual description at the second location in response to said step a), the textual description listing a street on which the vehicle is located and describing the vehicle location textually without a graphical map representation; and (H) at the second location, dispatching assistance to the vehicle location based upon the textual description.

2. The method of claim 1, wherein steps (C) through (F) are performed using a global positioning system.

3. The method of claim 1, wherein step (G) is performed by the substeps of determining whether a portion of any known street is within a preselected distance from the longitudinal and latitudinal placement of the vehicle and placing such streets within a first possible street set; and determining whether any street within the first possible street set has a specified direction that corresponds to the direction of travel of the vehicle and placing such streets within a second possible street set.

4. The method of claim 3, wherein step (G) is performed by the further substeps of determining whether any street within the second possible street set has an associated speed range that corresponds to the speed of travel of the vehicle and placing such streets within a third possible street set; and determining which street from within the third possible street set is closest to the placement of the vehicle and defining the street where the vehicle is located as the closest street from within the third possible street set.

5. The method of claim 4, wherein the third possible street set contains no streets and wherein step (G) is performed by the further substeps of determining which street from within the second possible street set is closest to the placement of the vehicle and defining the street where the vehicle is located as the closest street from within the second possible street set.

6. The method of claim 4, wherein the third possible street set contains no streets, the second possible street set contains no streets and wherein step (G) is performed by determining which street from within the first possible street set is closest to the vehicle location and defining the street where the vehicle is located as the closest street from within the first possible street set.

7. The method of claim 4, wherein the first possible street set contains no streets and step (G) is performed by the further substep of determining which known street is closest to the placement of the vehicle and defining the street where the vehicle is located as the closest street.

8. The method of claim 3, wherein step (G) is performed by the further substeps of determining which street from within the second possible street set is closest to the placement of the vehicle and defining the street where the vehicle is located as the closest street from within the second possible street set.

9. The method of claim 3, wherein the preselected distance is 100 meters.

10. The method of claim 1, wherein the textual description of the vehicle location further includes at least one street that intersects with the street where the vehicle is located and wherein step (G) is performed by the substeps of determining the street where the vehicle is located and determining whether any known street has a portion that intersects with the street where the vehicle is located by searching along the street where the vehicle is located from the vehicle location in a direction corresponding to the vehicle direction of travel until an intersecting street is found.

11. The method of claim 10, wherein two intersecting streets are included in the textual description and a second intersecting street is determined by searching along the street where the vehicle is located from the vehicle location in a direction opposite from the vehicle direction of travel until the second intersecting street is found, such that the vehicle is located between the two intersecting streets.

12. The method of claim 11, wherein the textual description includes an approximate distance between the vehicle and the first and second intersecting streets, respectively and an orientation of the vehicle relative to the first and second intersecting streets.

13. The method of claim 11, wherein step (G) is performed using a digital mapping database.

14. The method of claim 10, wherein the textual description further includes a street address that is near the vehicle on the street where the vehicle is located, a name of a city, a name of a county and a name of a state where the vehicle is located.

15. The method of claim 1 further including the step of determining a street address to which the vehicle is closest, wherein the textual description indicates the street address.

16. The method of claim 1 further including the step of determining the street on which the vehicle is located automatically by a computer.

17. The method of claim 1 wherein the textual description can be read to dispatch assistance and sufficiently indicate the location of the vehicle.

18. A method of providing vehicle location information, comprising the steps of:

(A) generating an assistance request signal from the vehicle;

(B) receiving the assistance request signal at a second location, remote from the vehicle;

(C) determining a longitudinal placement of the vehicle;

(D) determining a latitudinal placement of the vehicle;

(E) determining whether a known street is within a preselected distance from the longitudinal and latitudinal placement of the vehicle and determining the street within the preselected distance that is closest to the placement of the vehicle, said step E) being performed automatically by a computer;

(F) generating a textual description of the vehicle location wherein the textual description lists closest street to where the vehicle is located and describes the vehicle location textually without reference to a graphical map representation;

(G) providing the textual description at the second location in response to said step a); and (H) at the second location, dispatching assistance to the vehicle location based upon the textual description.

19. The method of claim 18, further comprising the steps of determining a direction of travel of the vehicle and determining a speed of travel of the vehicle and wherein the closest street of step (F) is determined by determining whether a known street is within a second preselected distance from the vehicle placement and has a direction of permissible travel and a permissible range of speed of travel that correspond to the direction and speed of travel of the vehicle.

20. The method of claim 19, wherein no streets within the second preselected distance from the vehicle placement has a permissible range of speed that corresponds to the direction and speed of travel of the vehicle and wherein the closest street of step (F) is determined by determining whether a known street from within the second preselected distance has a direction of permissible travel that corresponds to the direction of travel of the vehicle.

21. A method of providing assistance to a remotely located vehicle, comprising the steps:

(A) generating an assistance request signal from the vehicle;

(B) receiving the assistance request signal at a second location, remote from the vehicle;

(C) determining a location of the vehicle, including automatically determining a current street on which the vehicle is located using a computer;

(D) providing a textual description of the vehicle location as determined in (C) at the second location in response to said step A), the textual description indicating the vehicle location, including the current street, without reference to a graphical map representation; and (E) at the second location, dispatching assistance to the vehicle location based upon the textual description.

22. A method of providing vehicle location information, comprising the steps of:

(A) generating a request signal from the vehicle;

(B) determining a longitudinal placement of the vehicle;

(C) determining a latitudinal placement of the vehicle;

(D) determining a current street on which the vehicle is located based upon said steps (B) and (C);

(E) determining a first intersecting street that intersects the current street based upon said steps (B)–(D);

(F) determining a second intersecting street that intersects the current street based upon said steps (B)–(D), the vehicle located on the current street between the first intersecting street and the second intersecting street; and (G) generating a textual description of the vehicle location wherein the textual description indicates textually, without reference to a graphical map representation, the current street, the first intersecting street and the second intersecting street, wherein said steps (D–G) are performed automatically by a computer in response to said step (A).

23. The method of claim 22 wherein said textual description further indicates a numerical distance from the vehicle to the first intersecting street.

24. The method of claim 23 wherein said textual description further indicates a numerical distance from the vehicle to the second intersecting street.

25. The method of claim 24 wherein said textual description further indicates an orientation of the vehicle relative to the first intersecting street and the second intersecting street, without reference to a graphical representation of a map.

26. The method of claim 24 further including the steps of:

providing the textual description at a second location remote from the vehicle location in response to said step A); and at the second location, dispatching assistance to the vehicle location based upon the textual description.

* * * * *